Oct. 23, 1928.　　　　　F. G. SLAGEL　　　　　1,688,401

STRAINER

Filed July 5, 1927

Inventor
Franklin G. Slagel
By Pope & Powers
Attorneys

Patented Oct. 23, 1928.

1,688,401

UNITED STATES PATENT OFFICE.

FRANKLIN G. SLAGEL, OF BUFFALO, NEW YORK, ASSIGNOR TO FEDDERS MANUFACTURING COMPANY, INC., A CORPORATION OF NEW YORK.

STRAINER.

Application filed July 5, 1927. Serial No. 203,305.

This invention relates to a strainer which is more particularly designed for removing large particles from refrigerating liquid and thereby prevent clogging of the conduits through which the refrigerating liquid circulates but it is to be understood that this strainer may also be used for other purposes.

Figure 1:
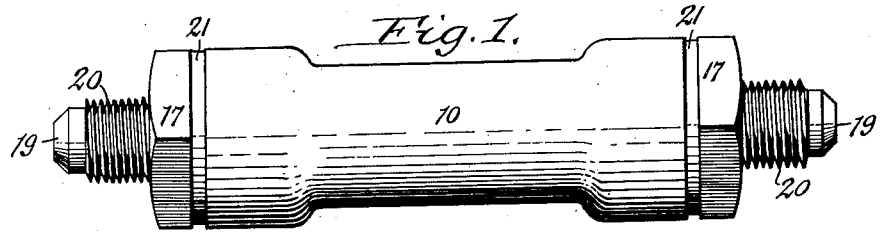
Figure 2:
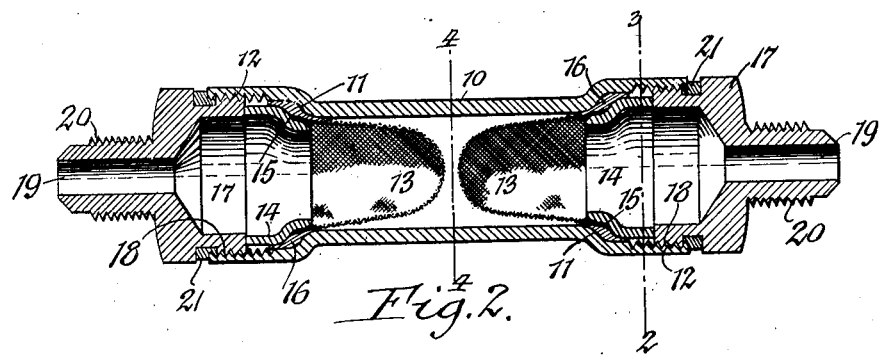
Figure 3:
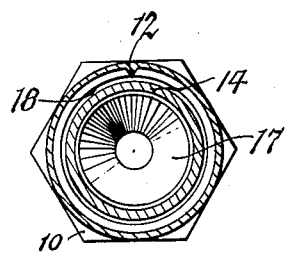
Figure 4:
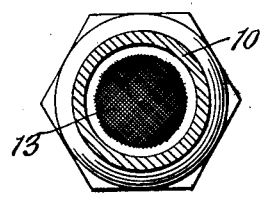

In the accompanying drawings:

Figure 1 is a side elevation of my improved strainer. Figure 2 is a longitudinal section of the same. Figures 3 and 4 are transverse sections taken on the correspondingly numbered lines in Figure 2.

Similar characters of reference indicate like parts in the several figures of the drawings.

The numeral 10 represents the casing of the strainer which is of tubular form and preferably provided on its interior near opposite ends thereof with internal annular outwardly facing shoulders 11 and at the extremities thereof with internal screw threads 12.

Within this casing are arranged the screening means which in the preferred construction consist of two cup-shaped screens 13, 13 of woven wire or other foraminous character. These screens are arranged with their convex faces opposing each other and each of these screens is provided at its outer edge with a reinforcing collar 14 which has a tapering end forming an inwardly facing external shoulder 15 which is opposite the shoulder on the respective end of the casing.

Between the shoulder of each collar and the adjacent shoulder of the casing is arranged a soft washer 16, preferably brass which is of conical form so that when the collar is forced inwardly a leak tight joint will be produced between the collar of each screen and the casing. This collar is forced against the respective washer by a bushing 17 which engages with the outer end of the respective collar by means of a screw connection between the bushing and the casing consisting preferably of an external screw thread 18 on the bushing engaging with the adjacent internal thread 12 of the casing.

Each bushing is adapted to be connected with a tube forming part of the conduit for the liquid to be strained, for which purpose the outer side of each bushing is provided centrally with a reduced nipple 19 having an external screw thread 20.

When the parts have been assembled in the manner described, the joints between the opposite ends of the casing and the bushings are filled with solder, as shown at 21, for the purpose of preventing leakage of liquid to the exterior of the strainer.

In using the strainer either of the nipples may be employed as an inlet for the liquid to be strained and the other as the outlet for the clarified liquid. As the raw liquid enters the inlet nipple it passes the concave to the convex side of one screen and then from the convex to the concave side of the other screen whereby the liquid is subjected to two successive screening operations and any large particles in the liquid are held back and only clear liquid permitted to pass on to the outlet. Owing to the cup-shape of the screens the same present a large screening area and therefore provides large capacity. The several parts are of simple construction, the same can be readily assembled and when cleaning or repairing is required this can be readily done by first removing the solder from the joints between the casing and bushing.

I claim as my invention:

A strainer comprising a tubular casing having an inlet and an outlet and an internal annular shoulder, a cup shaped screen arranged in said casing, a tapering collar secured to the edge of said screen and having an annular shoulder facing the shoulder of said casing, a bushing engaging said collar and having a screw connection with said casing, and a washer interposed between the shoulders of said collar and said casing.

In testimony whereof I affix my signature.

FRANKLIN G. SLAGEL.